US012748875B2

(12) United States Patent
Suvarna et al.

(10) Patent No.: US 12,748,875 B2
(45) Date of Patent: Sep. 29, 2026

(54) DYNAMIC GENERATION OF ACCESS CONTROL WORKFLOWS

(71) Applicant: International Business Machines Corporation, Armonk, NY (US)

(72) Inventors: Shreenivas Suvarna, Clarksburg, MD (US); Heather Nicole Polgrean, Lagrangeville, NY (US); Tiberiu Suto, Franklin, NY (US); Jessica Nahulan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 18/758,435

(22) Filed: Jun. 28, 2024

(65) Prior Publication Data

US 2026/0003986 A1 Jan. 1, 2026

(51) Int. Cl.
*G06F 21/62* (2013.01)

(52) U.S. Cl.
CPC ................................ *G06F 21/6218* (2013.01)

(58) Field of Classification Search
CPC ............. G06F 21/6218; G06F 21/6245; G06F 21/6254; G06F 21/606; G06F 21/10;
(Continued)

(56) References Cited

U.S. PATENT DOCUMENTS 8,645,843 B2 2/2014 Chee et al.
10,713,369 B2 7/2020 Tong et al.
(Continued)

FOREIGN PATENT DOCUMENTS

CN 102073817 5/2011
CN 102495985 B 6/2014
(Continued)

OTHER PUBLICATIONS

Author unknown, "AWS security credentials," 2024, 10 pages, amazon. com, accessed May 14, 2024, https://docs.aws.amazon.com/IAM/latest/UserGuide/security-creds.html.
(Continued)

*Primary Examiner* — Brian F Shaw
(74) *Attorney, Agent, or Firm* — Yee & Associates, P.C.

(57) ABSTRACT

Dynamically controlling access to confidential data is provided. The method comprises receiving input of a user security profile that specifies data access privileges for a user. Natural language processing is used to analyze a number of documented communications among authorized personnel regarding work related to the confidential data. From the analysis of the documented communications, a task is identified for the user that requires access privileges to the confidential data that the user security profile does not authorize. An urgency score for the task is calculated from the analysis of the documented communications. Responsive to a determination that the urgency score exceeds a
(Continued)

specified threshold, an access control workflow is automatically initiated that is routed to an authorizing agent. Authorization is received in near real-time from the authorizing agent, wherein the user security profile is updated to allow access to the confidential data for a specified duration.

20 Claims, 7 Drawing Sheets

(58) Field of Classification Search
CPC . H04L 63/0428; H04L 63/0876; H04L 63/08; H04L 63/123
See application file for complete search history.

(56) References Cited

U.S. PATENT DOCUMENTS

| | | | | |
|---|---|---|---|---|
| 10,789,204 | B2 | 9/2020 | Bergman et al. | |
| 10,878,079 | B2 | 12/2020 | Vepa et al. | |
| 11,080,390 | B2 | 8/2021 | Watson et al. | |
| 11,870,824 | B1 | 1/2024 | Singh et al. | |
| 2009/0077636 | A1* | 3/2009 | Duffie, III | H04L 63/08 726/5 |
| 2014/0047234 | A1* | 2/2014 | Davis | G06Q 10/10 713/160 |
| 2022/0101220 | A1 | 3/2022 | Wicaksono et al. | |
| 2022/0321570 | A1* | 10/2022 | Price | H04L 51/212 |
| 2022/0375292 | A1 | 11/2022 | Ufkes et al. | |
| 2025/0202899 | A1* | 6/2025 | Chen | H04L 63/102 |

FOREIGN PATENT DOCUMENTS

| | | |
|---|---|---|
| CN | 104881736 B | 11/2018 |
| CN | 110826088 A | 2/2020 |
| IN | 202317016781 | 11/2023 |
| JP | 2004062720 | 2/2004 |

OTHER PUBLICATIONS

Author unknown, "Cloud Database Market to Reach USD 38.6 Billion at a CAGR of 14.80% by 2030—Report by Market Research Future (MRFR)," Globe Newswire, Mar. 7, 2023, 7 pages, globenewswire.com, accessed May 14, 2024, https://www.globenewswire.com/en/news-release/2023/03/07/2621841/0/en/Cloud-Database-Market-To-Reach-USD-38-6-Billion-at-a-CAGR-of-14-80-by-2030-Report-by-Market-Research-Future-MRFR.html.

Author unknown, "Cloud database solutions," IBM Cloud Database Services, 2024, 7 pages, ibm.com, accessed May 14, 2024, https://www.ibm.com/cloud/databases.

Author unknown, "Configure field-level access," Google Cloud, 2024, 10 pages, google.com, accessed May 14, 2024, https://cloud.google.com/logging/docs/field-level-acl.

IBM Technology Youtube Channel, "Secure App Transactions and Sensitive Data with Cryptographic Key Encryption Protection," Jan. 28, 2022, youtube.com, accessed May 14, 2024, https://www.youtube.com/watch?v=RlcnXFZWrSl.

Memon, "The Evolution of Role-Based Access Control: How AI is Revolutionizing Security," Nov. 28, 2023, 7 pages, linkedin.com, accessed May 14, 2024, https://www.linkedin.com/pulse/title-evolution-role-based-access-control-how-ai-security-memon-plikf/.

Mysore et al., "How to use granular geographic match rules with AWS WAF," Feb. 22, 2023, 9 pages, amazon.com, accessed May 14, 2024, https://aws.amazon.com/blogs/security/how-to-use-granular-geographic-match-rules-with-aws-waf/.

* cited by examiner

400

| LOCATION | DEVICE | EXFILTRATION RISK SCORE | SECURITY SCORE | DATA OBFUSCATION REQUIRED |
|---|---|---|---|---|
| COMPANY OFFICE | COMPANY LAPTOP | 10 | 95 | NONE |
| COFFEE SHOP | COMPANY LAPTOP | 50 | 70 | PII, HIPAA |
| COFFEE SHOP | PERSONAL TABLET DEVICE | 70 | 20 | PII, HIPAA |
| PARTNER CLIENT SITE | COMPANY LAPTOP | 20 | 85 | HIPAA |

FIG. 4

DYNAMIC GENERATION OF ACCESS CONTROL WORKFLOWS

BACKGROUND

The disclosure relates generally to cloud computing and more specifically to cloud computing and database management, and more specifically to granting temporary access to confidential data.

Cloud databases store vast amounts of sensitive data, necessitating stringent security measures to safeguard against unauthorized access. Administrators and other database user roles may at various times require elevated privileges for performing database tasks, raising concerns about potential data breaches and confidentiality breaches. Existing solutions often lack fine-grained access control and dynamic provisioning capabilities. In today's business landscape, multiple access control methods exist and have been widely deployed by enterprises. Examples of such control methods include Role-Based Access Control (RBAC), Group-Based Access Control, Directory Services Integration (centralized directory services, such as Active Directory (AD) or Lightweight Directory Access Protocol (LDAP), to manage user accounts and groups), Policy-Based Access Control, Automated Provisioning Scripts, Privileged Access Management (PAM) Solutions, and Cloud-Based Access Management Services (services that allow administrators to define and manage access policies and permissions across various resources, including databases and other cloud services).

However, considering the goals of today's organizations in becoming more dynamic and agile, the above implementations do not provide satisfactory solutions that can understand and react to changes in access requirements driven by ever-evolving business needs.

SUMMARY

According to an illustrative embodiment a computer-implemented method for dynamically controlling access to confidential data is provided. The method comprises receiving input of a user security profile that specifies data access privileges for a user. Natural language processing is used to analyze a number of documented communications among authorized personnel regarding work related to the confidential data. From the analysis of the documented communications, a task is identified for the user that requires access privileges to the confidential data that the user security profile does not authorize. An urgency score for the task is calculated from the analysis of the documented communications. Responsive to a determination that the urgency score exceeds a specified threshold, an access control workflow is automatically initiated that is routed to an authorizing agent. Authorization is received in near real-time from the authorizing agent, wherein the user security profile is updated to allow access to the confidential data for a specified duration. According to other illustrative embodiments, a computer system and a computer program product for dynamically controlling access to confidential data are provided.

BRIEF DESCRIPTION OF THE DRAWINGS

FIG. 4 depicts an example of an exfiltration risk table in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
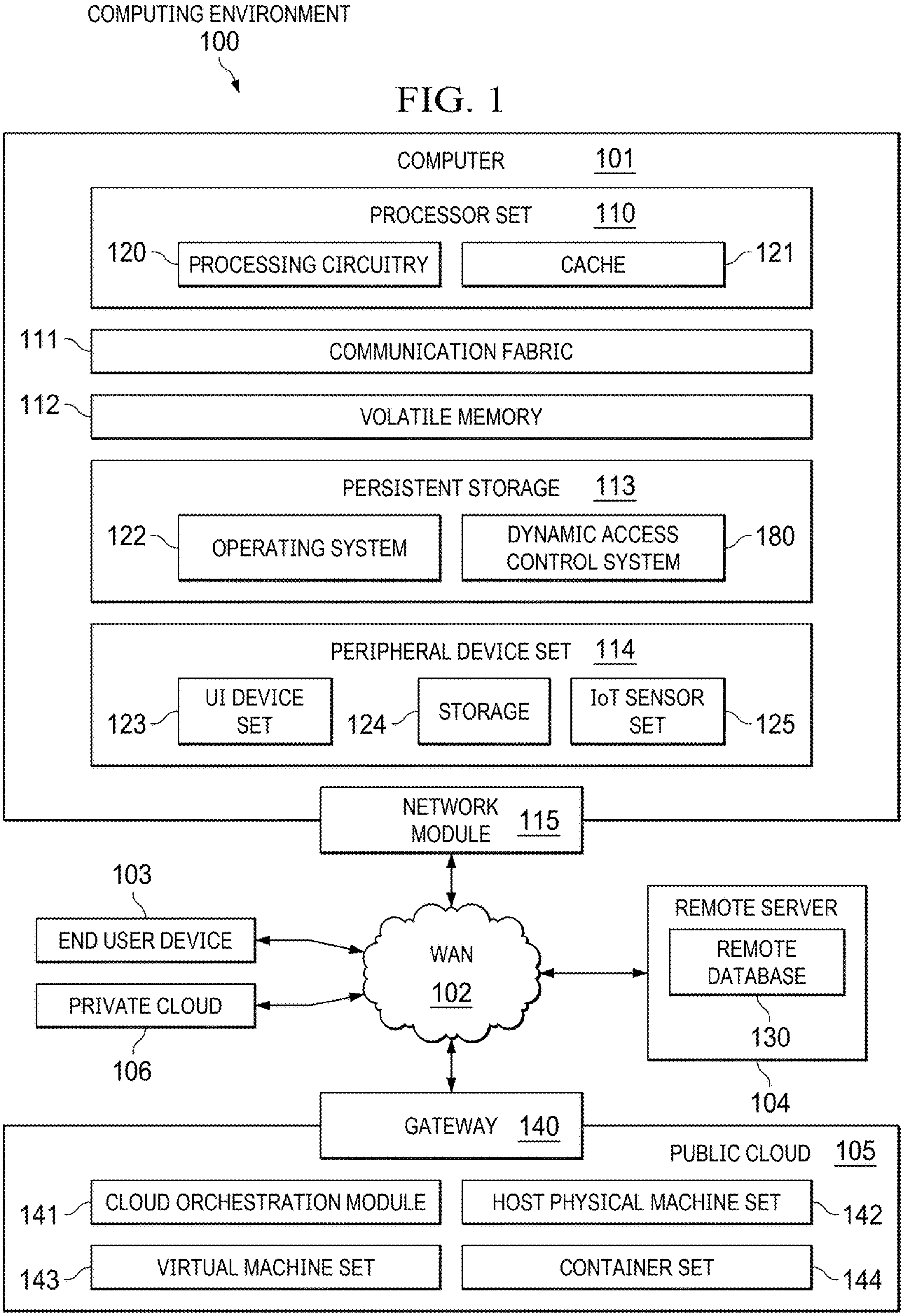
FIG. 1 is a block diagram of a computing environment in accordance with an illustrative embodiment.
Figure 2:
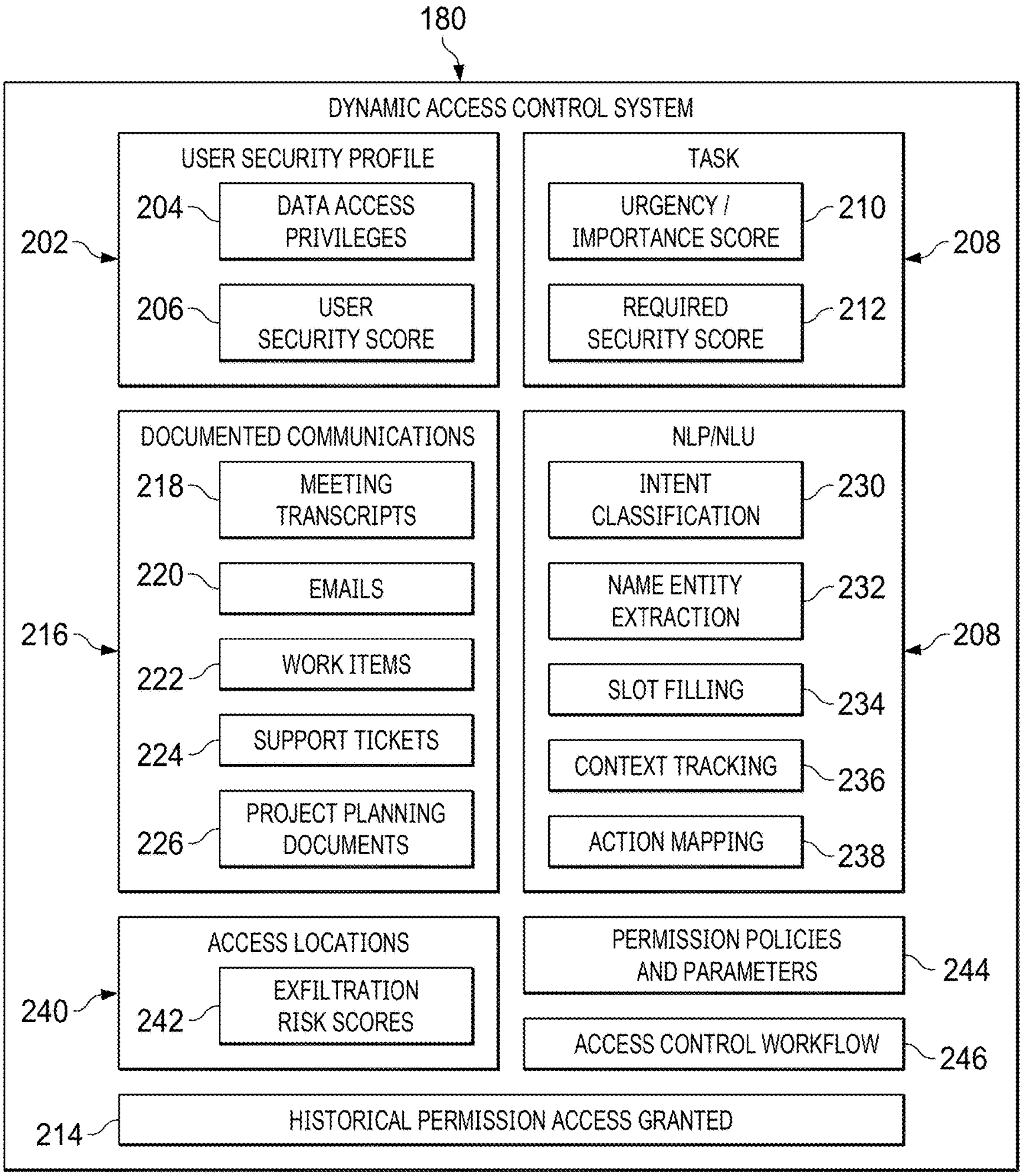
FIG. 2 depicts a block diagram for a dynamic access control system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as dynamic access control system 180.

In addition to dynamic access control system 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and dynamic access control system 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in dynamic access control system 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in dynamic access control system 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments provide a method for dynamically provisioning temporary administrative keys with fine-grained access control to confidential data down to the field level in databases such as, e.g., cloud databases. By combining access control mechanisms, dynamic key generation, and attribute-based encryption, the illustrative embodiments enable administrators to perform specific database management tasks while limiting access to sensitive information. This approach enhances data security, mitigates against unauthorized access, and ensures granular control over administrative privileges with database environments.

The illustrative embodiments provide a technical solution by aligning security controls with actual workflows and enterprise requirements. By directly linking access control to business processes, organizations can ensure that users are granted access privileges based on their actual roles, responsibilities, and the specific tasks at a specific time they need to perform it. This approach reduces the risk of over-privileged accounts and minimizes the potential for unauthorized access. When access control is aligned with business processes, it streamlines operations and minimizes disruptions caused by inadequate or inappropriate access permissions.

Many regulatory frameworks and industry standards require organizations to demonstrate that access controls are implemented based on well-defined business processes and roles. By infusing the workflows with the actual document or verbal trail of the decisions that required the specific accesses, the illustrative embodiments allows organizations to present a better security posture than traditional workflows based on a generic comment justifying the need for access.

The illustrative embodiments allow users to receive access in almost real-time, without the need for manual requests or interventions. This streamlined approach enhances the user experience and reduces frustration caused by delays or barriers in accessing necessary resources.

The illustrative embodiments also provide agility and adaptability, making it easier for organizations and administrators to adapt to changing business requirements or organizational restructuring. As processes evolve or new ones are introduced, access controls can be dynamically updated, ensuring that security remains aligned with the organization's operations. By linking access control to business processes, organizations may not need to do yearly access review and recertifications as the access will be controlled much more granularly at the project or task level.

The illustrative embodiments also enable organizations to reduce the manual effort and overhead associated with managing access rights. This automation not only saves time and resources but also minimizes the risk of human errors in access provisioning.

FIG. 2 depicts a block diagram for a dynamic access control system in accordance with an illustrative embodiment. FIG. 2 shows a detailed example of dynamic access control system 180 in FIG. 1.

Dynamic access control system 180 is able to make changes to data access privileges 204 of a user security profile 202 on an as-needed basis. Dynamic access control system 180 utilizes NLP/NLU (Natural Language Processing/Natural Language Understanding) 228 to analyze documented communications 216 among authorized team members of a work project. These documented communications 216 might comprise meeting transcripts 218, emails 220, work items 222, support tickets 224, project planning documents 226, and other written and/or verbal communications between team members. Based on this analysis, NLP/NLU 228 identifies a task 208 for the user corresponding to user security profile 202.

NLP/NLU 228 might employ several machine learning techniques to analyze documented communications 216. Intent classification 230 categorizes text based on the intent behind it. The goal is to identify the purpose or goal of a user's input, which can then be used to provide appropriate responses or actions. Name entity extraction 232 seeks to locate and classify named entities mentioned in unstructured text into pre-defined categories such as person names, organizations, locations, time expressions, etc. Slot filling 234 identifies and extracts structured information from unstructured text, which can be used to populate a data structure or form. Context tracking 236 maintains and manages relevant information (context) to ensure consistency, relevance, and accuracy of intentions and decisions. In the context of NLP, context tracking 236 keeps track of previous interactions and statements to understand the flow of a conversation. Action mapping 238 converts natural language input into executable actions or commands such as invoking an API or querying a database. Dynamic access control system 180 uses NLP/NLU 228 to identify the user and the task 208 and may also cross-reference historical permission access granted 214 to identify similar contexts in which access to confidential data was granted.

If task 208 has an urgency/importance score 210 above a defined threshold, the dynamic access control system 180 can initiate access control workflow 246 to authorize the user to access confidential data related to the task 208. Authorization might be subject to permission policies and parameters 244 specified by the organization or administrators. Task 208 might also have a required security score 212 that the user security profile 202 must meet. If the user security score 206 associated with the security profile 202 does not meet the required security score 212 of task 208, the user might have to complete additional training or education requirements before the access authorization is complete.

After access to the confidential data is authorized for the user, the access might also be selectively restricted depending on the access locations 240 from which the user is accessing the data, which is determined by exfiltration risk scores 242 assigned to respective locations.

Figure 3A:
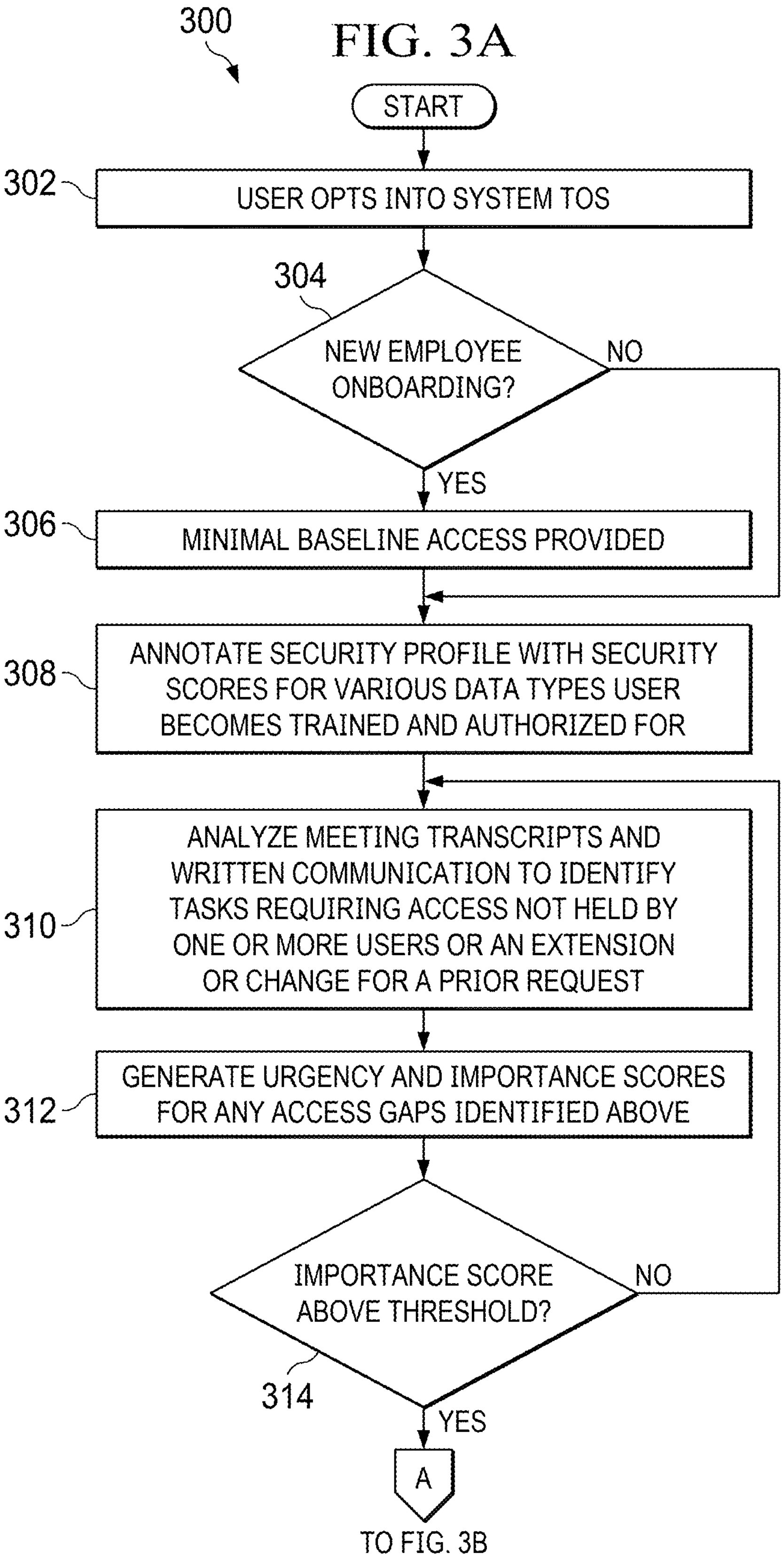
FIG. 3A depicts a process flow for the operation of a dynamic access control system in accordance with an illustrative embodiment.
Figure 3B:
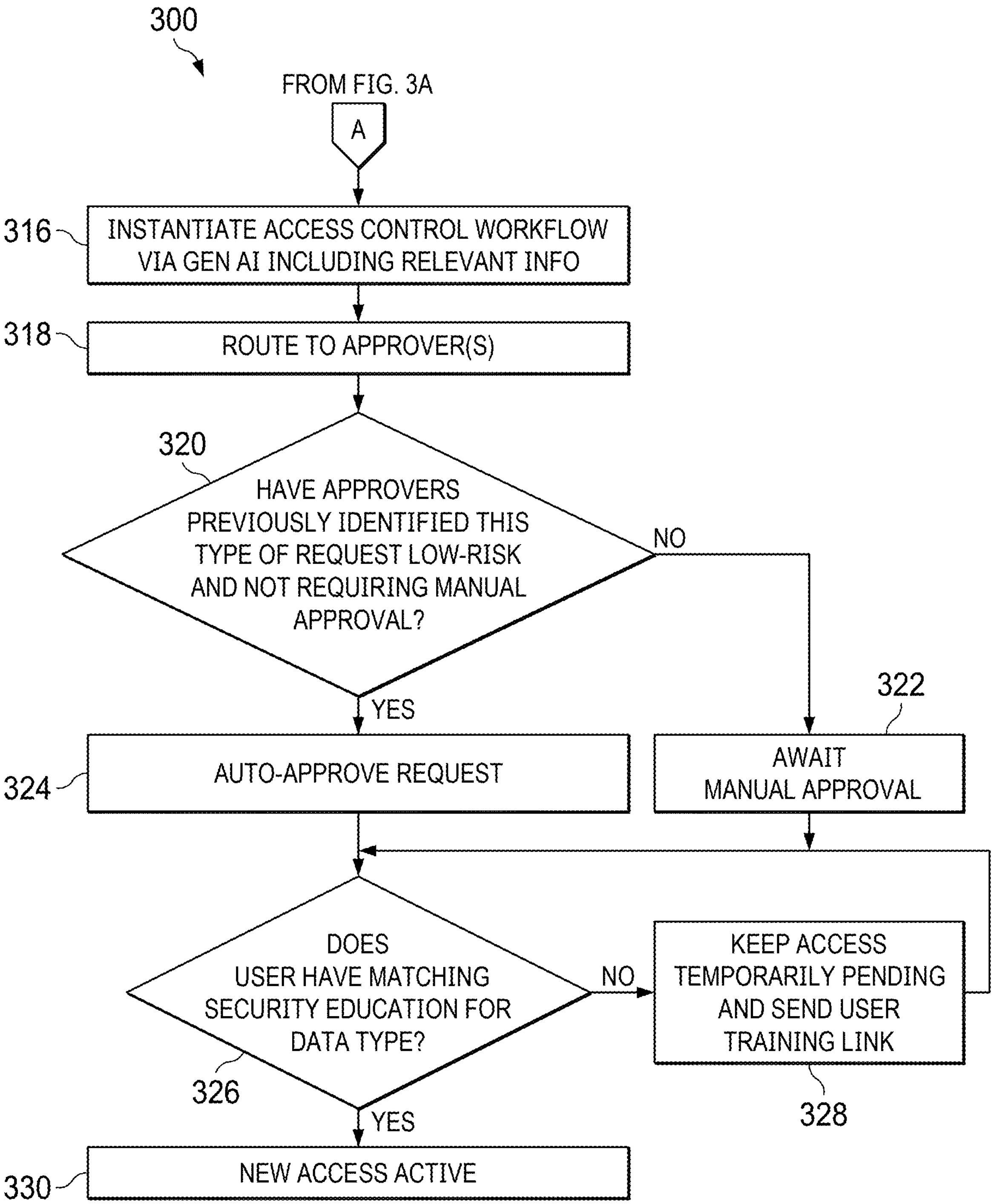
FIG. 3B depicts the process flow for the operation of a dynamic access control system in accordance with an illustrative embodiment.

FIGS. 3A and 3B depict a process flow for the operation of a dynamic access control system 180 in accordance with an illustrative embodiment. Process 300 begins with a user opting into the system's terms of service (TOS) (step 302). At step 304, the system determines whether the user is a new employee that is onboarding.

During employee onboarding minimal baseline access is given for the employee role with placeholders for potential access not yet granted at this time (step 306).

As the employee completes training in various security training related to handling data such as Sensitive Personal Information (SPI), Personally Identifiable Information (PII), Protected Health Information (PHI), and other data that classified as private or confidential, the employee's security profile is annotated with a security score generated for each particular data type the employee becomes trained and authorized to handle (step 308). This score may initially be set to, e.g., 100, and then automatically adjusted over time depending on the most recent completion date of training and specific events that may occur since the training. In some embodiments, the user's own profile, job role, background, team, etc., will be used to set the initial baseline score, or to modify the score as a user's work experience changes.

Meetings and other communications such as emails, work items and, support tickets, between employees and managers or other employees authorized to manage access to certain company resources are analyzed through NLP (step 310). From this analysis a task is identified that requires a particular access not currently held by one or more users or an extension or change to a previous request. Urgency scores may be calculated representing the urgency and importance of the request (step 312). For example, the urgency scores might each be in the range of 1 to 100.

Data/resources/environments requiring access privileges provisioning/deprovisioning associated with certain teams, projects, product-areas, and tasks may be derived based on historical permission access granted in the past under associated similar contexts. This access may also be moderated by permission rules and parameters set by administrators to govern the access privileges around the data/resources in question or to moderate certain permissions or data as requiring escalated assessment and human approval. This step can help ensure that the permissions being derived as necessary for the identified access requirement comply with access policies.

Process 300 determines whether the urgency score of the task exceeds a specified threshold (step 314). If the urgency score in is above the threshold, the system will automatically instantiate an access control workflow via generative AI (step 316). As part of the access control workflow, the system may summarize and include information such as, e.g., specific access needed, a particular location and time relevant to access, an employee security score relevant to data type and a recommendation on approval grant or decline based on historical decisions made for individuals of similar scoring and under similar project/permission requirements, any particular risks and constraints related to the access that the systems may have determine based on historical data or based on parameters and identifiers set by the data/resource admins, and attachment of written or verbal communication documentation related to the access request. In some embodiments, this documentation may include reasoning from past approved access requests which gave comments on why certain individuals and data were required for a similar project and any other context annotations available to aid the approver. Additionally, as a safeguard to prevent any effects of potential hallucination of NLP AI models, the summarization can include a confidence score, and the approver would also be enabled to view the original source components that were used to generate the summarized request.

Once the access request workflow is generated, it is routed to the relevant approver(s) to authorize access for those resources (step 318). In some embodiments, and for specific access requests that are determined to be low-risk, the relevant approvers may authorize an automatic approval within the process enabling a seamless and delay-free experience for the user (step 320). If the approver has not authorized automatic approval, process 300 awaits manual approval (step 322). If the approver has authorized automatic approval, process 300 automatically approves the request (step 324). In some embodiments, the system may be enabled to send a challenge to the user via email or office messaging system before authorizing the automatic approval. The access becomes effective immediately as long as the user meets the score threshold for the security education for the particular data type as described above (step 326). If the user does not meet the security score threshold, the access remains pending temporarily, and the user is sent a link to the relevant security education instead (step 328). Once training is completed to the required level, the access seamlessly becomes effective at that time (step 330).

When specific users with enhanced access levels are going to be out-of-office for a particular amount of time, the access may be deprovisioned for that time for enhanced security. The out-of-office determination may be also derived from NLP analysis of communications and/or calendaring events.

In some embodiments, if the source used to generate the access control workflow was a work-item or support ticket originating from outside of the project team, but still related to the project, dynamic changes to the original ticket's status can be used to modify the workflow. Examples of dynamic changes include an assignee change, a comment from an administrator indicating additional access will be required, a priority status change (such as a severity change of a ticket to critical), or even the ticket being closed and marked as resolved. Modifications may include expediting or escalating the pending approval requirement on the approver(s) (in the case of a priority status escalation to critical), or even autocancelling the workflow request, for instance, if the original task/issue is closed or marked as resolved or has an assignee change. In the case of an assignee change, any already approved/granted accesses can be dynamically deprovisioned and removed from the previously authorized user.

FIG. 4 depicts an example of an exfiltration risk table in accordance with an illustrative embodiment. In order to prevent data exfiltration, the dynamic access control system may use a scoring system to determine whether to allow certain pre-approved location changes. For example, if a developer was approved access to work with PII data at a company office location and requested a change of access location to that of a coffee shop, the dynamic access control system may change the data access level to obfuscate certain data due to the security score of the new location and may send the workflow for approval (manual or automatic). For an initial request to be automatically approved, there may be a threshold that the security score of a location should be above, e.g., 90. For location changes after the initial approval, a downgrade to the data type or manual approval re-route may be applied when the change is requested to a location with a lower security score. Exfiltration risk scores may also vary according to device type.

Using an example in table 400, accessing data with a company computer in the company office has a high security score and low exfiltration risk score. Therefore, no data obfuscation is required. In contrast, accessing data on a personal tablet device in a coffee shop has a low security score and a high exfiltration risk score, thereby necessitating obfuscation of several categories of confidential data. In this manner, the illustrative embodiments allow adaptation of access control measures based on the geographic location or networking context of users, especially applicable for mobile or remote employees, ensuring dynamic adjustment of access rights in line with the security profile associated with the user's current location or connection.

Access control levels or privileges may be automatically modified in response to identified security threats or patterns of anomaly, utilizing integration with threat intelligence platforms or employing machine learning algorithms to adjust access controls based on analyzed communication patterns. The system can interface with external identity and access management (IAM) services or multi-factor authentication (MFA) mechanisms, enhancing security measures beyond internal communication and contextual analysis for access decision-making. The system can monitor user behavior in accessing resources and subsequently adjust access control policies based on deviations from established patterns, indicating potential security risks.

The dynamic access control system can employ predictive modeling designed to forecast future access needs based on analysis of project timelines, employee roles, and historical access patterns, facilitating proactive generation of access control workflows. The illustrative embodiments can customize access control workflows in alignment with specific organizational roles or project requirements, including the dynamic adjustment of access controls as project parameters or roles evolve over time. For example, as a member transitions from design to testing, the member's access is dynamically updated to reflect current needs.

The dynamic access control system can be integrated with project management and collaboration tools, facilitating the direct derivation of access control requirements from tasks, milestones, and communications within such platforms.

Upon the detection of project completion, task fulfillment, or termination of employment, the dynamic data access system can revoke access rights, leveraging analysis of communications and project status to initiate the deprovisioning process.

The illustrative embodiments can be adapted to various languages and dialects, enabling its effective deployment in multinational organizations with diverse linguistic needs in communication.

Below is an example of a project team employing the illustrative embodiments:

Project: Intranet directory and personal data update website project

Project ID: 181508368

Meeting 1: Project kickoff and requirements gathering

Date: May 25, 2024

Time: 10:00 AM

Participants

Paul-Project Manager

Robert-HR manager

Charles-Database Admin (DBA)

Thomas-Frontend Developer

Steven-Backend Developer

Lily-HR representative

Wendy-HR representative

Sandi-HR representative

. . . snippets from meeting transcript . . .

<<<

Paul (PM): Good morning team, today we are kicking off the intranet directory and personal data update website project. The primary objective is to create a centralized intranet directory for all employees. The directory should display name, job title, department, and contact details such as email and phone number. Additionally, we need a separate website for employees to update their personal data, including emergency contacts, addresses, and other relevant information to augment their HR record.

The development is scheduled to start on June 1st. Phase one will begin with Steven working with Charles on the back-end development, setting up the server-side scripting and DB connectivity and this phase will last one to two weeks. Once complete, phase 2 will involve Thomas and James in our New York office working on the front-end development for a period of one to two weeks. The data used during development can be masked and used for just testing functionality without exposing the actual data. In phase 3, Lily, Wendy, and Sandi will be testing the application to validate function and accuracy. During this phase, actual employee data has to be used during testing, and this data may contain SPI (sensitive personal information).

>>>

Workflow generated by invention as a result of this meeting:

Send to: hr_db_access@example.com (Approver of access to HR DB)

Subject: Access request to HR DB for upcoming project

Details:

Project name: Intranet directory and personal data update website project

Project ID: 181508368

Related to above project, access will be needed for following individuals and during the following expected timeframes:

Steven and Charles, from June 1 to June 14

Thomas and James, from June 8 to June 22, this should be limited to the New York office and the data should be masked for development use Lily, Wendy and Sandi, starting on June 29th. This will be the actual data which contains SPI and Lily and Wendy already have had their training completed in handling SPI related data. Sandi has not had this training yet, however even if this request is approved, her access will only be effective once the training is completed.

Actions:

<Approve> <Deny>

[ ] Check here to allow auto-approval of timing changes to these requests

[ ] Check here to allow auto-approval of location changes to these requests

Figure 5:
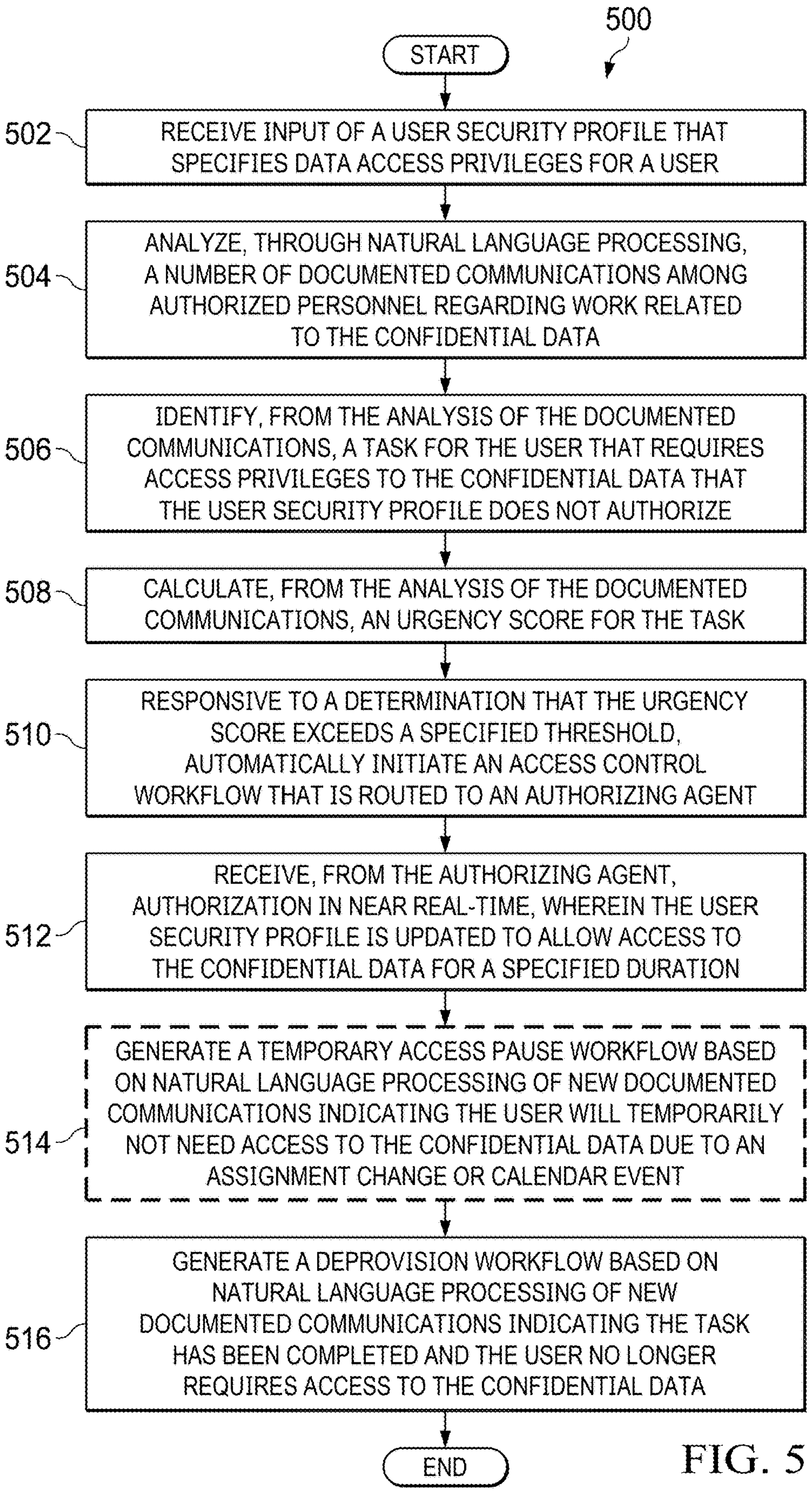
FIG. 5 depicts a flowchart illustrating a process for dynamically controlling access to confidential data in accordance with an illustrative embodiment.

FIG. 5 depicts a flowchart illustrating a process for dynamically controlling access to confidential data in accordance with an illustrative embodiment. Process 500 may be implemented in dynamic access control system 180.

Process 500 begins by receiving input of a user security profile that specifies data access privileges for a user (502).

Process 500 analyzes, through natural language processing, a number of documented communications among authorized personnel regarding work related to the confidential data (step 504).

From the analysis of the documented communications, a task is identified for the user that requires access privileges to the confidential data that the user security profile does not authorize (step 506). The task may be identified based on historical permission access granted in similar contexts, subject to specified permission policies and parameters.

From the analysis of the documented communication, an urgency score for the task is calculated (step 508).

Responsive to a determination that the urgency score exceeds a specified threshold, process 500 automatically initiating an access control workflow that is routed to an authorizing agent (step 510).

Authorization is received from the authorizing agent in near real-time, wherein the user security profile is updated to allow access to the confidential data for a specified duration (step 512). The user security profile comprises a security score based on education and experience, and wherein the authorization is subject to the security score meeting a specified threshold for the task. The authorization may dynamically obfuscate subsets of the confidential data according to exfiltration risk scores associated with different locations of access.

Optionally, process 500 might generate a temporary access pause workflow based on natural language processing of new documented communications indicating the user will temporarily not need access to the confidential data due to an assignment change or calendar event (step 514).

A deprovision workflow is generated based on natural language processing of new documented communications indicating the task has been completed and the user no longer requires access to the confidential data (step 516). Process 500 then ends.

Figure 6:
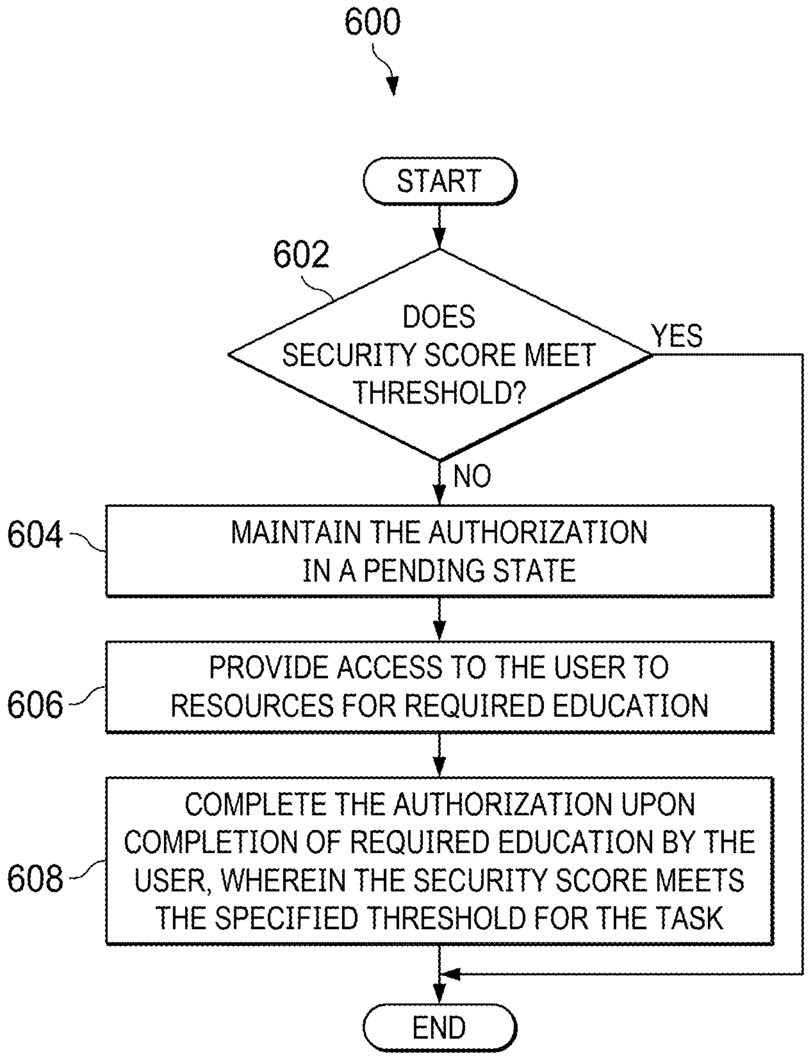
FIG. 6 depicts a flowchart illustrating a process for enforcing required security scores in accordance with an illustrative embodiment.

FIG. 6 depicts a flowchart illustrating a process for enforcing required security scores in accordance with an illustrative embodiment. Process 600 may be initiated as a subprocess within step 512 in FIG. 5.

Responsive to a determination that the security score does not meet the specified threshold for the task (step 602), process 600 maintains the authorization in a pending state (step 604) and provides access to the user to resources for required education (step 606). Process 600 completes the authorization upon completion of required education by the user, wherein the security score meets the specified threshold for the task (step 608). Process 600 then ends.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for dynamically controlling access to confidential data, the method comprising:

using a number of processors to perform:

receiving input of a user security profile that specifies data access privileges for a user;

analyzing, through natural language processing, a number of documented communications among authorized personnel regarding work related to the confidential data, wherein the natural language processing comprises named entity recognition to extract references to the confidential data from the documented communications and temporal information extraction to identify deadline expressions in the documented communications;

identifying, from the analysis of the documented communications, a task for the user that requires access privileges to the confidential data that the user security profile does not authorize;

calculating, from the analysis of the documented communications, an urgency score for the task, wherein the urgency score is a numerical composite metric in a range from 1 to 100 computed by combining:

a time-to-deadline value derived from the deadline expressions identified by the temporal information extraction; and a priority indicator derived from a priority status associated with the documented communications referencing the task, wherein the urgency score quantifies business-process urgency of the task based solely on the time-to-deadline value and the priority indicator;

responsive to a determination that the urgency score exceeds a specified threshold, automatically initiating an access control workflow that is routed to an authorizing agent; and receiving, from the authorizing agent, authorization sufficiently in advance of the deadline identified from the documented communications to enable the user to perform the task, wherein the user security profile is automatically updated to allow access to the confidential data for a specified duration.

2. The method of claim 1, wherein identifying the task is based on historical permission access granted in similar contexts, subject to specified permission policies and parameters.

3. The method of claim 1, wherein the user security profile comprises a security score based on education and experience, and wherein the authorization is subject to the security score meeting a specified threshold for the task.

4. The method of claim 3, further comprising, responsive to a determination that the security score does not meet the specified threshold for the task:

maintaining the authorization in a pending state;

providing access to the user to resources for required education; and completing the authorization upon completion of required education by the user, wherein the security score meets the specified threshold for the task.

5. The method of claim 1, wherein the authorization dynamically obfuscates subsets of the confidential data according to exfiltration risk scores associated with different locations of access.

6. The method of claim 1, further comprising generating a temporary access pause workflow based on natural language processing of new documented communications indicating the user will temporarily not need access to the confidential data due to an assignment change or calendar event.

7. The method of claim 1, further comprising generating a deprovision workflow based on natural language processing of new documented communications indicating the task has been completed and the user no longer requires access to the confidential data.

8. A system for dynamically controlling access to confidential data, the system comprising:

a storage device that stores program instructions;

one or more processors operably connected to the storage device and configured to execute the program instructions to cause the system to:

receive input of a user security profile that specifies data access privileges for a user;

analyze, through natural language processing, a number of documented communications among authorized personnel regarding work related to the confidential, wherein the natural language processing comprises named entity recognition to extract references to the confidential data from the documented communications and temporal information extraction to identify deadline expressions in the documented communications;

identify, from the analysis of the documented communications, a task for the user that requires access privileges to the confidential data that the user security profile does not authorize;

calculate, from the analysis of the documented communications, an urgency score for the task, wherein the urgency score is a numerical composite metric in a range from 1 to 100 computed by combining:

a time-to-deadline value derived from the deadline expressions identified by the temporal information extraction; and a priority indicator derived from a priority status associated with the documented communications referencing the task, wherein the urgency score quantifies business-process urgency of the task based solely on the time-to-deadline value and the priority indicator;

responsive to a determination that the urgency score exceeds a specified threshold, automatically initiate an access control workflow that is routed to an authorizing agent; and receive, from the authorizing agent, authorization sufficiently in advance of the deadline identified from the documented communications to enable the user to perform the task, wherein the user security profile is automatically updated to allow access to the confidential data for a specified duration.

9. The system of claim 8, wherein identifying the task is based on historical permission access granted in similar contexts, subject to specified permission policies and parameters.

10. The system of claim 8, wherein the user security profile comprises a security score based on education and experience, and wherein the authorization is subject to the security score meeting a specified threshold for the task.

11. The system of claim 10, wherein the program instructions further cause the system to, responsive to a determination that the security score does not meet the specified threshold for the task:

maintain the authorization in a pending state;

provide access to the user to resources for required education; and complete the authorization upon completion of required education by the user, wherein the security score meets the specified threshold for the task.

12. The system of claim 8, wherein the authorization further comprises instructions to further cause the system to dynamically obfuscate subsets of the confidential data according to exfiltration risk scores associated with different locations of access.

13. The system of claim 8, wherein the program instructions further cause the system to generate a temporary access pause workflow based on natural language processing of new documented communications indicating the user will temporarily not need access to the confidential data due to an assignment change or calendar event.

14. The system of claim 8, wherein the program instructions further cause the system to generate a deprovision workflow based on natural language processing of new documented communications indicating the task has been completed and the user no longer requires access to the confidential data.

15. A computer program product for dynamically controlling access to confidential data, the computer program product comprising:

a persistent storage medium having program instructions configured to cause one or more processors to:

receive input of a user security profile that specifies data access privileges for a user;

analyze, through natural language processing, a number of documented communications among authorized personnel regarding work related to the confidential, wherein the natural language processing comprises named entity recognition to extract references to the confidential data from the documented communications and temporal information extraction to identify deadline expressions in the documented communications;

identify, from the analysis of the documented communications, a task for the user that requires access privileges to the confidential data that the user security profile does not authorize;

calculate, from the analysis of the documented communications, an urgency score for the task, wherein the urgency score is calculated from a time value derived from the time expressions extracted from the documented communications and a priority value derived from a priority status associated with the documented communications referencing the task;

responsive to a determination that the urgency score exceeds a specified threshold, automatically initiate an access control workflow that is routed to an authorizing agent; and receive, from the authorizing agent, authorization sufficiently in advance of the deadline identified from the documented communications to enable the user to perform the task, wherein the user security profile is automatically updated to allow access to the confidential data for a specified duration.

16. The computer program product of claim 15, wherein identifying the task is based on historical permission access granted in similar contexts, subject to specified permission policies and parameters.

17. The computer program product of claim 15, wherein the user security profile comprises a security score based on education and experience, and wherein the authorization is subject to the security score meeting a specified threshold for the task, and wherein, responsive to a determination that the security score does not meet the specified threshold for the task further comprising instructions to:

maintain the authorization in a pending state;

provide access to the user to resources for required education; and complete the authorization upon completion of required education by the user, wherein the security score meets the specified threshold for the task.

18. The computer program product of claim 15, wherein the authorization further comprises instructions to dynamically obfuscate subsets of the confidential data according to exfiltration risk scores associated with different locations of access.

19. The computer program product of claim 15, further comprising instructions to generate a temporary access pause workflow based on natural language processing of new documented communications indicating the user will temporarily not need access to the confidential data due to an assignment change or calendar event.

20. The computer program product of claim 15, further comprising instructions to generate a deprovision workflow based on natural language processing of new documented communications indicating the task has been completed and the user no longer requires access to the confidential data.

* * * * *